US008850355B2

(12) United States Patent
Bennetts et al.

(10) Patent No.: US 8,850,355 B2
(45) Date of Patent: Sep. 30, 2014

(54) SYSTEMS AND METHODS FOR COMMUNICATING WITH MEDIA MODULES

(75) Inventors: Christopher Lee Bennetts, Hsin Tien (TW); Christopher W. Larsen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 13/003,532

(22) PCT Filed: Jul. 14, 2008

(86) PCT No.: PCT/US2008/069946
§ 371 (c)(1),
(2), (4) Date: Jan. 10, 2011

(87) PCT Pub. No.: WO2010/008375
PCT Pub. Date: Jan. 21, 2010

(65) Prior Publication Data
US 2011/0113372 A1    May 12, 2011

(51) Int. Cl.
| | |
|---|---|
| *G06F 3/048* | (2013.01) |
| *G06F 1/00* | (2006.01) |
| *H04N 21/442* | (2011.01) |
| *G06F 9/44* | (2006.01) |
| *G06F 1/32* | (2006.01) |
| *G06F 3/0482* | (2013.01) |
| *H04N 7/16* | (2011.01) |
| *H04N 21/431* | (2011.01) |
| *H04N 21/443* | (2011.01) |
| *H04N 21/478* | (2011.01) |
| *H04N 21/482* | (2011.01) |
| *H04N 21/6547* | (2011.01) |

(52) U.S. Cl.
CPC ............ *H04N 21/4424* (2013.01); *G06F 9/441* (2013.01); *G06F 1/3203* (2013.01); *G06F 3/0482* (2013.01); *H04N 7/163* (2013.01); *H04N 21/4312* (2013.01); *H04N 21/4314* (2013.01); *H04N 21/4436* (2013.01); *H04N 21/478* (2013.01); *H04N 21/4825* (2013.01); *H04N 21/6547* (2013.01)
USPC ......................................... 715/810; 713/300

(58) Field of Classification Search
CPC ..... G06F 9/441; G06F 9/4418; G06F 3/0482; G06F 1/3203
USPC ......................................... 715/810; 713/300
See application file for complete search history.

(56) References Cited

U.S. PATENT DOCUMENTS

| | | | |
|---|---|---|---|
| 677,125 A1 | 6/2004 | Jae-Choeul | |
| 7,055,046 B2 * | 5/2006 | Malueg et al. | ................ 713/320 |

(Continued)

FOREIGN PATENT DOCUMENTS

| | | |
|---|---|---|
| JP | 05-040735 | 2/1993 |
| KR | 10-2006-0042496 | 5/2006 |

OTHER PUBLICATIONS

The International Search Report and the Written Opinion of the International Searching Authority for International Application No. PCT/US2008/069946 dated Mar. 31, 2009, pp. 11.

*Primary Examiner* — Tadeese Hailu (57) ABSTRACT

Systems and methods for communicating with media modules associated with a computing device are provided. In this regard, a representative method, among others, includes receiving an input to execute at least one media module and determining a power state of a computing device. The computing device generally has multiple power states. The method further includes launching the at least one media module based on the power state of the computing device responsive to determining the power state of the computing device. The media module is configured to be launched from any one of the multiple power states of the computing device.

20 Claims, 10 Drawing Sheets

(56) References Cited

U.S. PATENT DOCUMENTS

| | | | |
|---|---|---|---|
| 7,272,730 B1* | 9/2007 | Acquaviva et al. | 713/300 |
| 7,702,733 B2* | 4/2010 | Fleck et al. | 709/206 |
| 2003/0065497 A1* | 4/2003 | Rhoads | 703/18 |
| 2003/0135769 A1 | 7/2003 | Loughran | |
| 2004/0003300 A1* | 1/2004 | Malueg et al. | 713/300 |
| 2005/0044433 A1* | 2/2005 | Dunstan | 713/320 |
| 2005/0076256 A1* | 4/2005 | Fleck et al. | 713/320 |
| 2006/0053311 A1* | 3/2006 | Chary | 713/300 |
| 2006/0123252 A1* | 6/2006 | Vaidya et al. | 713/300 |
| 2006/0123253 A1* | 6/2006 | Morgan et al. | 713/300 |
| 2006/0242438 A1* | 10/2006 | Baba et al. | 713/300 |
| 2009/0077395 A1* | 3/2009 | Tsai | 713/310 |
| 2009/0094467 A1* | 4/2009 | Baba et al. | 713/300 |
| 2011/0004749 A1* | 1/2011 | Bennetts et al. | 713/100 |

* cited by examiner

SYSTEMS AND METHODS FOR COMMUNICATING WITH MEDIA MODULES

TECHNICAL FIELD

The present disclosure relates to computing devices, and more particularly, the disclosure relates to systems and methods for communicating with media modules associated with a computing device.

BACKGROUND

Desktop computers and laptops are processing information faster and storing more information and software applications. Typically, each software application is designed as a stand alone application and does not interact with other software applications. For example, a music application accesses a file configured specifically for the music application. Other applications, such as, a photo application, cannot access the music file and the music application cannot access the photo file. A user may be overwhelmed with the multiple software applications and the various different features associated with each application.

SUMMARY

Systems and methods for communicating with media modules associated with a computing device are provided. In this regard, a representative method, among others, includes receiving an input to execute at least one media module and determining a power state of a computing device, which generally has multiple power states. The method further includes launching the at least one media module based on the power state of the computing device responsive to determining the power state of the computing device. The media module is configured to be launched from any one of the multiple power states of the computing device.

A representative system, among others, includes a menu system that receives an input to execute at least one media module. The menu system is configured to determine a power state of a computing device, which has multiple power states. The system further includes at least one media module that communicates with the menu system, which is further configured to facilitate launching the at least one media module based on the power state of the computing device. The at least one media module is configured to be launched from any one of the multiple power states of the computing device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which the steps of communicating with the media modules of the computing devices are provided.

Figure 1:
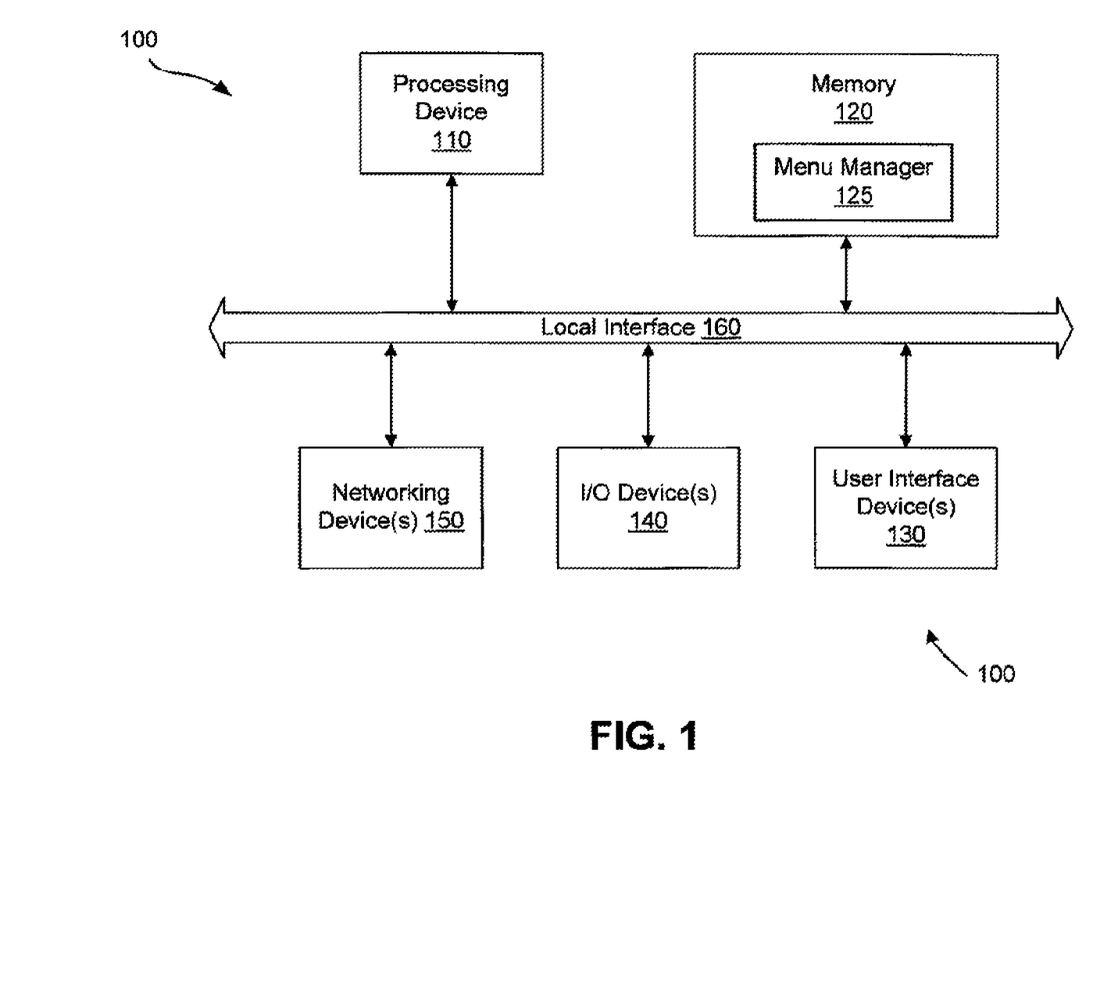
FIG. 1 is a block diagram that illustrates an embodiment of a computer system that is configured to communicate with media modules.

FIG. 1 is a block diagram that illustrates an embodiment of a computer system 100 that is configured to communicate with media modules. The computer system 100 can include, but not limited to, a laptop computer, a desktop computer, and a server, among other computing devices. As indicated in FIG. 1, the computer system 100 comprises a processing device 110, memory 120, one or more user interface devices 130, one or more I/O devices 140, and one or more networking devices 150, each of which is connected to a local interface 160.

The processing device 110 can include any custom made or commercially available processor, a central processing unit (CPU) or an auxiliary processor among several processors associated with the laptop computer, desktop computer, and server, a semiconductor based microprocessor (in the form of a microchip), or a macroprocessor. The memory 120 can include any one or a combination of volatile memory elements (e.g., random access memory (RAM, such as DRAM, SRAM, etc.)) and nonvolatile memory elements (e.g., ROM, hard drive, tape, CDROM, Flash Memory, etc.).

The one or more user interface devices 130 comprise those components with which the user (e.g., administrator) can interact with the generic computer system 100. Where the computing components of the system 100 comprise server computers or similar devices, these components can comprise those typically used in conjunction with a PC such as a keyboard and mouse.

The one or more I/O devices 140 comprise components used to facilitate connection of the computing devices of the system 100 to other devices and therefore, for instance, comprise one or more serial, parallel, small system interface (SCSI), universal serial bus (USB), or IEEE 1394 (e.g., Firewire™) connection elements. The networking devices 150 comprise the various components used to transmit and/or receive data over the network (not shown), where provided.

By way of example, the networking devices 150 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 120 normally comprises various programs (in software and/or firmware) including an operating system (O/S) (not shown) and a menu manager 125. The O/S controls the execution of programs, including the menu manager 125, and provides scheduling, input-output control, file and data management, memory management, and communication control and related services. Operations of the menu manager 125 are described in relation to FIGS. 2-11.

Figure 2:
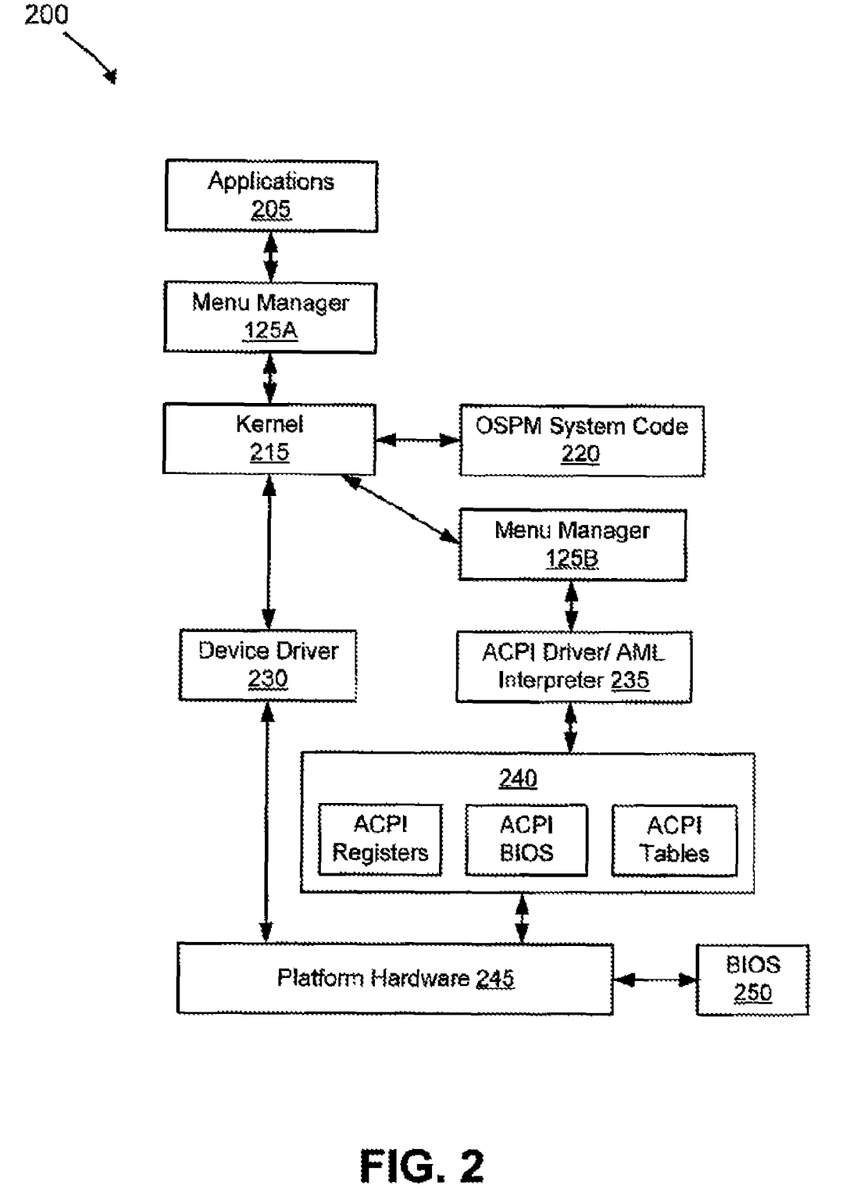
FIG. 2 is a block diagram that illustrates an embodiment of a computer system, such as that shown in FIG. 1, that includes a menu manager that communicates with an advanced configuration and power interface (ACPI) to facilitate communication with the media modules.

FIG. 2 is a block diagram that illustrates an embodiment of a computer system, such as that shown in FIG. 1, that includes a menu manager 125 that communicates with an advanced configuration and power interface (ACPI) 235, 240 to facilitate communication with the media modules. The ACPI 235, 240 is generally an interface specification comprised of both software and hardware elements for hardware recognition, motherboard and device configuration and power management, among other functions. The computer system 200 includes a platform hardware 245 that includes, for example, a computer's architecture, operating system, and programming languages, among others. The platform hardware 245 communicates with the basic input/output system (BIOS) 250 that identifies and initiates component hardware, e.g., device driver 230 (such as, hard disk, floppy, and optical disk drives, among others) and kernel 215.

The platform hardware 245 further communicates with an ACPI content 240, which includes ACPI tables that describe the interface to the hardware. The description generally provides information that facilitates the operation and functionality of the hardware component of the computer system 200. The ACPI content 240 further includes ACPI registers that facilitate the operation of the ACPI tables as well as an ACPI BIOS, which boots the computer system 200 and implements interfaces for sleep, wake, and some restart operations.

The ACPI content 240 communicates with a menu manager 125B via an ACPI driver/AML interpreter 235. The menu manager 125B is electrically coupled to the kernel 215 that is electrically coupled to an OSPM system code 220. Alternatively or additionally, a menu manager 125A can facilitate communication between the applications 205 and kernel 215. An application 205 generally refers to a computer software that is executed by the computer system 200 and can perform certain tasks. The application 205 includes, but is not limited, to music, video, and picture applications, word processing and spreadsheet applications, and other software services, such as, Snapfish™ and Youtube™. The menu manager 125 is further described in relation to FIG. 3-11. In general, the kernel 215 connects the application 205 to the hardware of the computer system 200, such as, device driver 230, ACPI driver/AML interpreter 235, ACPI content 240, platform hardware 245, and BIOS 250.

Figure 3:
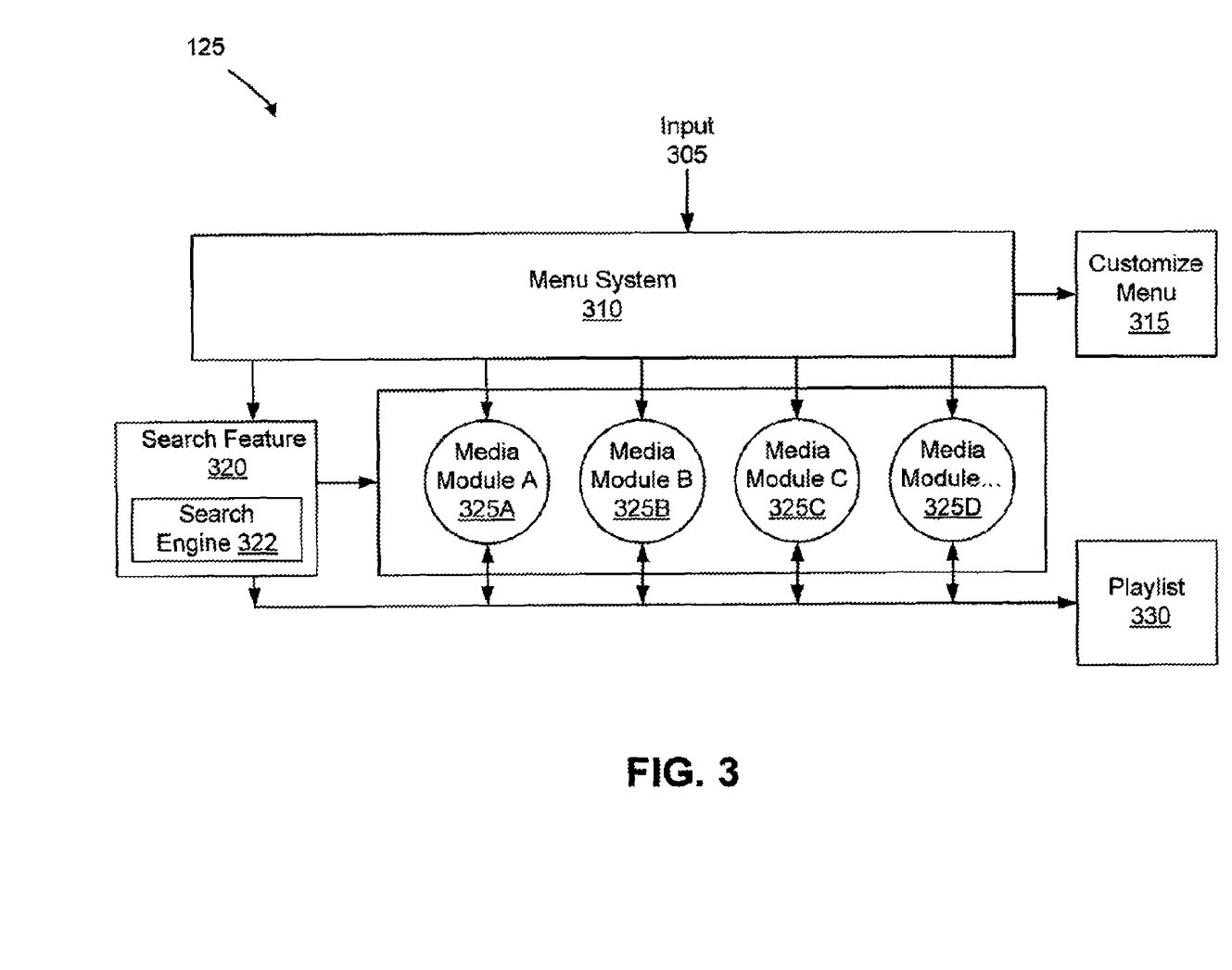
FIG. 3 is a block diagram that illustrates an embodiment of a menu manager, such as that shown in FIG. 2.

FIG. 3 is a block diagram that illustrates an embodiment of a menu manager 125, such as that shown in FIG. 2. The menu manager 125 includes a menu system 310 that receives an input 305 from, for example, a user. The menu system 310 includes, for example, a software service that acts as the main entry point for the applications 205 (FIG. 2). The menu system 310 communicates with a customize menu 315, a search feature 320, and media modules 325A-D. The search feature 320 and the media modules 325A-D communicates with a playlist 330. The media modules 325A-D are generally software applications associated with media content, such as music, picture, and video applications. The media modules 325A-D can also include other software applications, such as, word processing and spreadsheet applications, and other software services, such as, Snapfish™ and Youtube™. The menu system 310 enables the user to perform at least one of the following:

1. Access menu functionality from within another media module 325;
2. Add and remove media modules 325A-D displayed on a display device (not shown) from a list of media modules 325A-D that can be updated via the Internet (not shown);
3. Customize a menu interface 610, 710 (FIGS. 6 and 7) via the customize menu 315 with a color scheme, background picture, transparency level and a "return to last state & resume operation" setting;
4. Search for digital media and television (Internet streamed and live) content via the search feature 320;
5. Add digital media & recorded/on-demand television content from media modules 325A-D and the search feature 320 to the playlist 330;
6. Watch the playlist 330 in full screen or in overlay windowed mode; and
7. Share the playlist 330 via upload to Snapfish™, Youtube™ or burning to Audio CDV/VCD/DVD.

Figure 6:
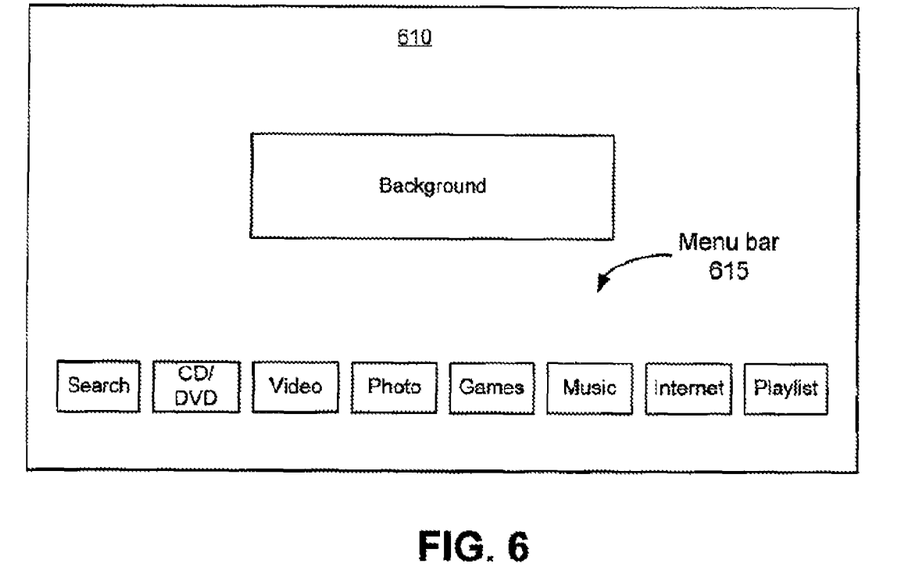
FIG. 6 is a graphical user interface that illustrates an embodiment of a full menu user interface associated with a menu manager, such as that shown in FIG. 3.
Figure 7:
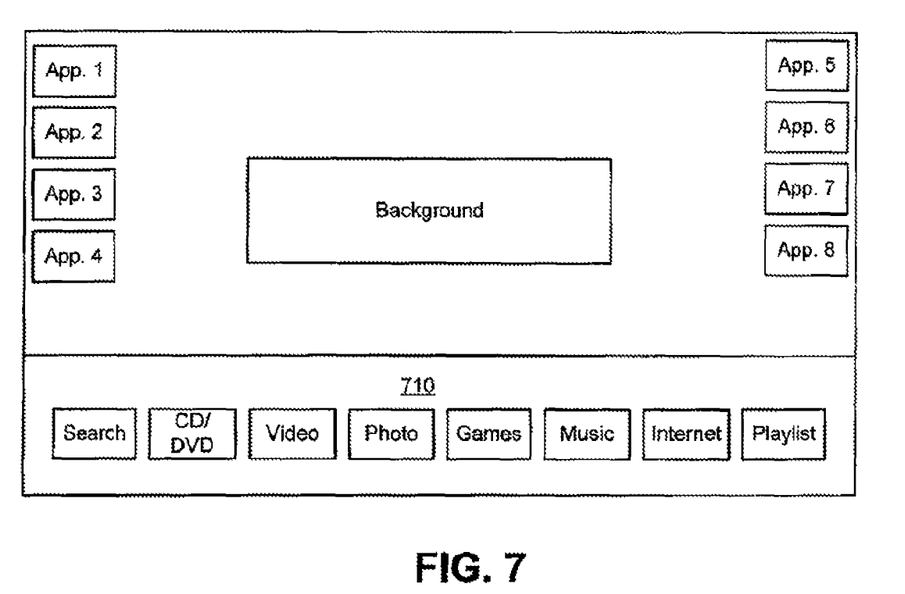
FIG. 7 is a graphical user interface that illustrates an embodiment of a menu bar user interface associated with a menu manager, such as that shown in FIG. 3.

Alternatively or additionally, the menu system 310 can have the capability to display messages to the users that inform them about news relating to the media module's experiences and the availability of updates. When a user adds or removes a media module 325 from the menu interface 610, 710, the menu manager 125 can refresh the menu interface 610, 710 to reflect the change.

If a user selects a media module 325 that has not been downloaded or available to the menu manager 125, the menu system 310 can begin the download process. After the download is complete, the menu manager 125 can install the media module 325 and place a button icon associated with the downloaded media module 325 in the menu interface 610, 710, regardless of whether the user is using the software service or an application associated with menu manager 125 at the time. Alternatively or additionally, the menu manager 125 can resume an interrupted download of the media module 325. The media module 325 has, but is not limited to, at least one of the following factors:

1. Be a separate executable file or operating system;
2. Be able to add file pointers within the playlist 330 for local, network and web-based for media content;
3. When queried by the media system 310 or search feature 320, be able to output search metadata about unique digital media content offered by the feature module, e.g., metadata about on-demand Internet TV shows;
4. Be able to accept a script to load and play a local or streamed digital media file;
5. Follow the user interface design language and have different color schemes; and
6. When initialized, the medial module 325 can return to the last power state of the computer system 200 and resume operation.

The search feature 320 allows the user to search for digital media and television (e.g., Internet streamed and live) content. The digital media content can be searched from local storage, such as, the memory 120, as well as universal plug and play (UPnP) devices and Snapfish™ if the services are operational and connected. Live, recorded and Internet streamed on-demand television can also be searched using metadata and electronic programming guides (if available). The user can search for content by accessing the search feature 320 on the menu interface 610, 710.

The search feature 320 can provide a search by keywords and once the query is accepted, a search engine 322 of the search feature can "crawl" through all available offline & online storage, as well as make search requests to a television module's electronic programming guide and Internet TV content providers. As the query progresses, positive matches can be displayed to the user. If a user highlights an item found in the search result, a thumbnail of the content can be displayed. The user can either load the item or add it to the playlist 330. The menu system 310 can load the appropriate media module 325 and make a request to the media module 325 to load the media content item and begin playback. If the media module 325 is already loaded then the search feature 320 can make a request to load the media content item and begin playback.

The playlist 330 can be available from ACPI S0 power state and enables the user to add digital media and recorded/on-demand television content to the playlist 330 from any media module 325 or from the search result of the search feature 320. The playlist 330 can be stored and retrieved, viewed in full screen or as a resizable overlay-window, uploaded to Snapfish™ or YouTube™, and burned to Audio CD or Video DVD. Music, picture and video (inc. recorded television) content can be added to the playlist 330 from within media module 325 or through the search feature 320. Media can be local or from an online service. On-demand Internet television can be a link to a streaming file.

The user can access the playlist 330 by way of the menu interface 610, 710. The playlist 330 can be part of the menu system 310 or the media module 325 developed by a third party vendor. The playlist 330 can be stored locally or on removable storage. The playlist 330 can be stored in a location specific to the media module 125 and can be configured not to be changed by the user. When the user ends the session of a media module 125 and the playlist 330 has not been saved by the user exists, the user can be prompted to save the playlist 330. If the user decides not save the playlist 330 then the menu manager 125 can be configured not to store the playlist 330 to memory 120. The user can perform at least one of the following functions from within the playlist 330:

1. View current playlist 330 or load an existing playlist 330. If an existing playlist 330 is loaded, there should be the ability to return to the previous (temporary) playlist 330.

2. Scroll through list of items in current playlist 330 and see associated preview thumbnail graphics.

3. Change order of media content items in the playlist 330.

4. View the playlist 330 as a mash-up in full screen or as a resizable overlay-window.

5. Upload the playlist 330 to Snapfish™ as an album of pictures.

6. Upload the playlist 330 as a video to YouTube™.

7. Burn the playlist 330 to a Audio CD or Video DVD

The playlist 330 can be viewed in full screen mode or as a resizable overlay-window. If the user selects to watch the playlist 330 in full screen mode, the user can have the option to dynamically change to a resizable overlay-window or return to the user interface of the playlist 330. An overlay-window is generally a media player component that runs as a service on top of all applications. The overlay-window can be dynamically resized and has basic player controls, as well as a button to return to the playlist user interface or full screen playback mode.

The customize menu feature 315 enables the user to customize the interface of the media modules 325 and the menu system 310. The user can perform at least one of the following:

1. Select a new color scheme from a range of five schemes.

2. Add a background picture to the full menu user interface 610 (FIG. 6).

3. Change the transparency level of the default or custom background picture.

4. Upon pressing the button on a menu bar 615 (FIG. 6) in a new session, the user can select whether they want to go the full menu user interface 610 or to resume from the last media module 325 and media file playing.

Figure 4:
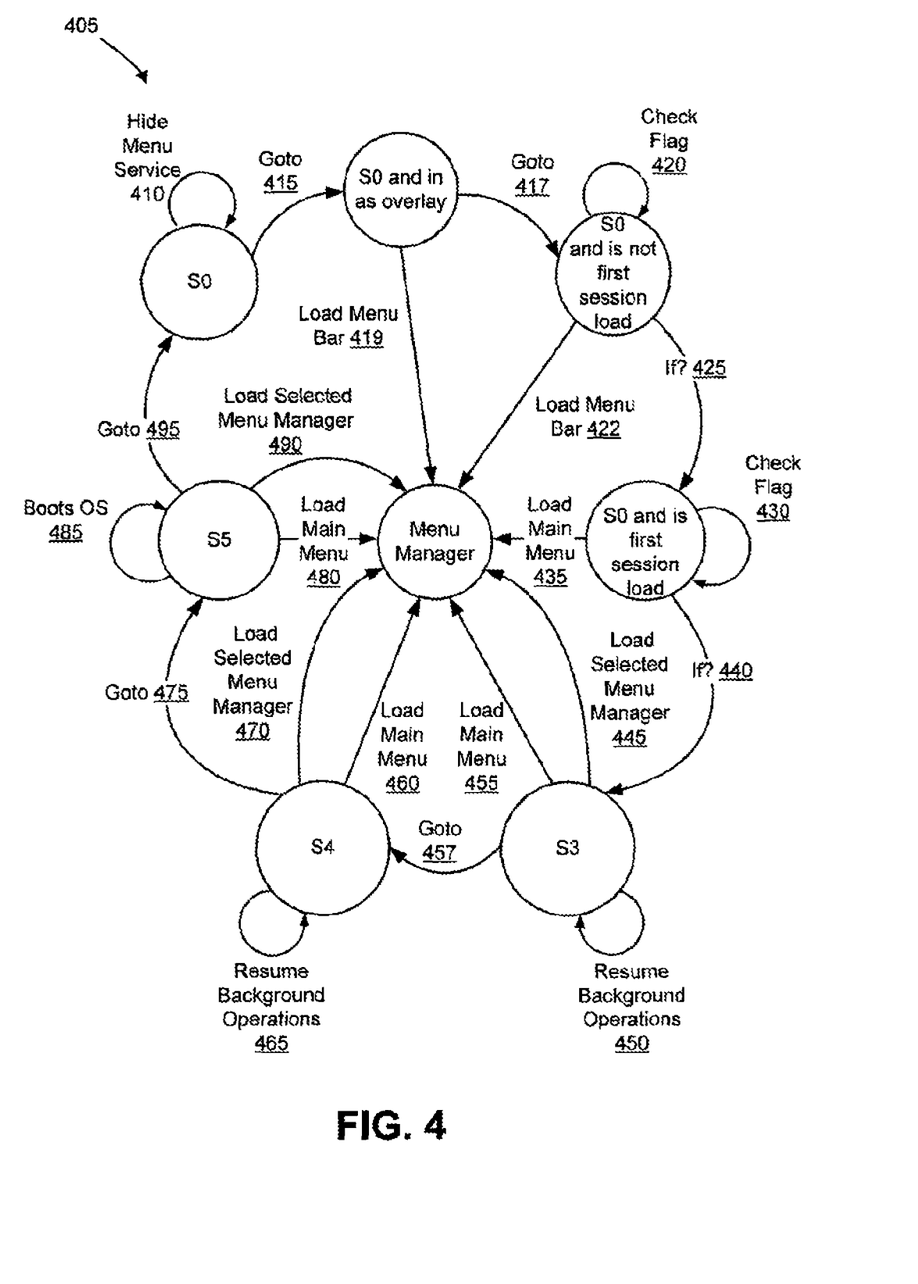
FIG. 4 is a diagram that illustrates an embodiment of a state logic diagram in which a menu manager, such as that shown in FIG. 2, can be accessed from at least one of the ACPI power state.

FIG. 4 is a diagram that illustrates an embodiment of a state logic diagram in which a menu manager, such as that shown in FIG. 2, can be accessed from at least one of the ACPI power state. The interface of the menu manager 125 can be displayed in, for example, less than one second. If a user accesses the menu manager 125 from S5, S4 or S3 ACPI power states then the interface of the menu manager 125 can display the functionality available from a power state, and/or instruct the power state to change to, for example, S0 ACPI power state and load the media module 325 with the feature associated with the S0 ACPI power state. Alternatively or additionally, the search feature 320 (FIG. 3) can be available from the S0 ACPI power state to the use in menu interface 610, 710.

The menu manager 125 has different behaviors for power and operation states. The table below describes the state behavior and the state logic diagram.

TABLE 1

| State When Menu manager receives Input | Actions |
| --- | --- |
| S5 ACPI Power State | At step 480, load Full Menu User Interface 610 (FIG. 6) in less than, for example, 1 sec. At step 485, boots operating system, e.g., Windows, in background of user interface. At step 490, when media module 325 is selected, show loading splash page and load windows media module. |
| S4 ACPI Power State | At step 460, load Full Menu User Interface 610 in less than, for example, 1 sec. At step 465, resume operating system, e.g., Windows, from suspend in background of user interface. At step 470, when media module 325 is selected, load windows media module. |
| S3 ACPI Power State | At step 445 load Full Menu User Interface 610 in less than, for example, 1 sec. At step 450, resume operating system, e.g., Windows, from suspend in background of user interface. |

TABLE 1-continued

| State When Menu manager receives Input | Actions |
|---|---|
| | At step 455, when media module 325 is selected, load windows media module. |
| S0 ACPI Power State and is first session load | At step 430, check resume state flag. At step 440, if flag = "resume previous media module 325 and operation" then load media module 325 and trigger resume operation flag of media module 325. Else at step 435 load Full Menu User Interface 610 in less than, for example, 1 sec. |
| S0 ACPI Power State and is not first session load | At step 420, check resume state flag. At step 425, if flag = "resume previous media module 325 and operation" then load media module 325 and trigger resume operation flag of media module 325. Else at step 422 load Menu Bar User Interface 710 (FIG. 7) in less than, for example, 1 sec. |
| S0 ACPI Power State and in as overlay in current media module 325 | At step 419, load menu bar 615 as overlay in current media module 325. |
| S0 ACPI and In Full or Bar Menu Interface 610, 710 | At step 410, hide the menu service. |

Figure 5:
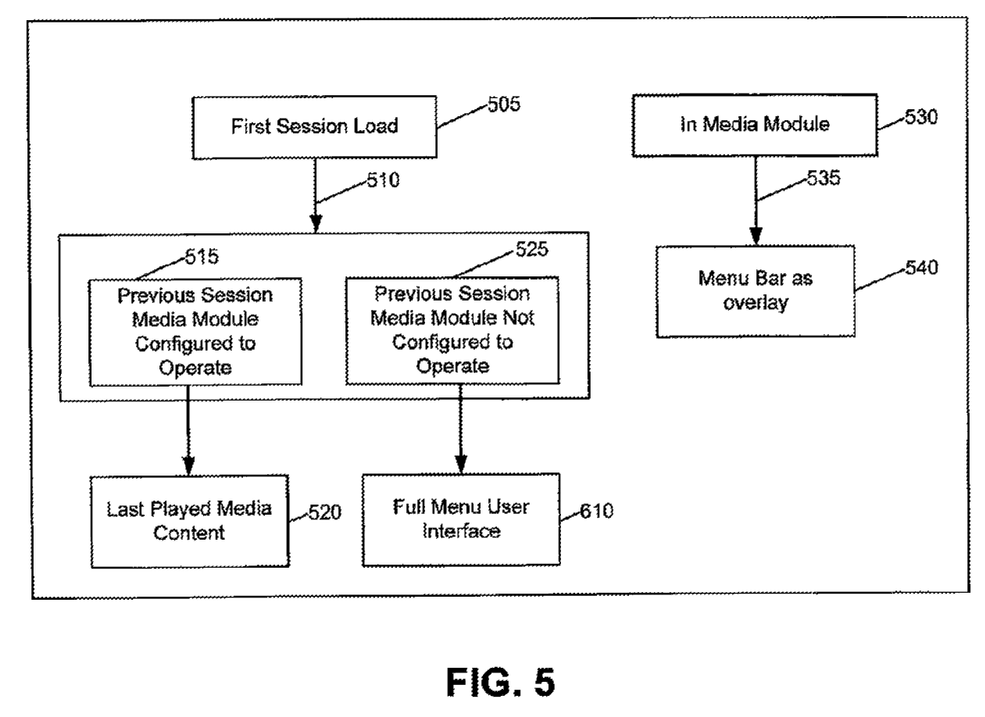
FIG. 5 is a diagram that illustrates an embodiment of a state behavior diagram in which a menu manager performs certain actions at a S0 ACPI power state, such as that shown in FIG. 4.

FIG. 5 is a diagram that illustrates an embodiment of a state behavior diagram in which the menu manager 125 performs certain actions at the S0 ACPI power state, such as that shown in FIG. 4. In the S0 ACPI power state, the menu manager 125 at step 505 determines whether the S0 ACPI power state has a first session load. At step 510, the menu manager 125 check resume state flag. The resume state flag indicates whether the previous session media module 325 is configured to operate at the S0 ACPI power state.

If the previous session media module 325 is configured to operate at the S0 ACPI power state, the menu manager 125 at step 515 accesses the last used media module 325 and resume the last played media content 520. If the previous session media module 325 is not configured to operate at the S0 ACPI power state, the menu manager 125 at step 525 loads and displays the full menu user interface 610 on a display device. The menu manager 125 at step 530 determines whether the media module 325 is operating at the S0 ACPI power state. If the media module 325 is operating at the S0 ACPI power state, the menu manager 125 at step 535 loads a menu bar 615 (FIG. 6) as an overlay in the current media module 540.

FIG. 6 is a graphical user interface that illustrates an embodiment of a full menu user interface associated with the menu manager 125, such as that shown in FIG. 3. The menu manager 125 can display the full menu user interface 610, which generally fills the display device of a computing device. The full menu user interface 610 can be displayed from all ACPI power states, and can have a menu bar 615 that includes rows of buttons that represents the functionality of the menu manager 125 and the media modules 325. Each button is associated with a media module 325 that can be launched by way of, for example, clicking on the button.

FIG. 7 is a graphical user interface that illustrates an embodiment of a menu bar user interface 710 associated with the menu manager 125, such as that shown in FIG. 3. The menu bar user interface 710 generally does not fill the display device of the computing device. Rather the menu bar user interface 710 is illustrated similar to the menu bar 615 of FIG. 6 and can be located along, for example, the top, middle or bottom of the display device. The menu bar user interface 710 contains buttons that give access to the functionality of the menu manager 125 and the media modules 325. The menu manager 125 can hide and display the menu bar user interface 710 on the display device.

Figure 8:
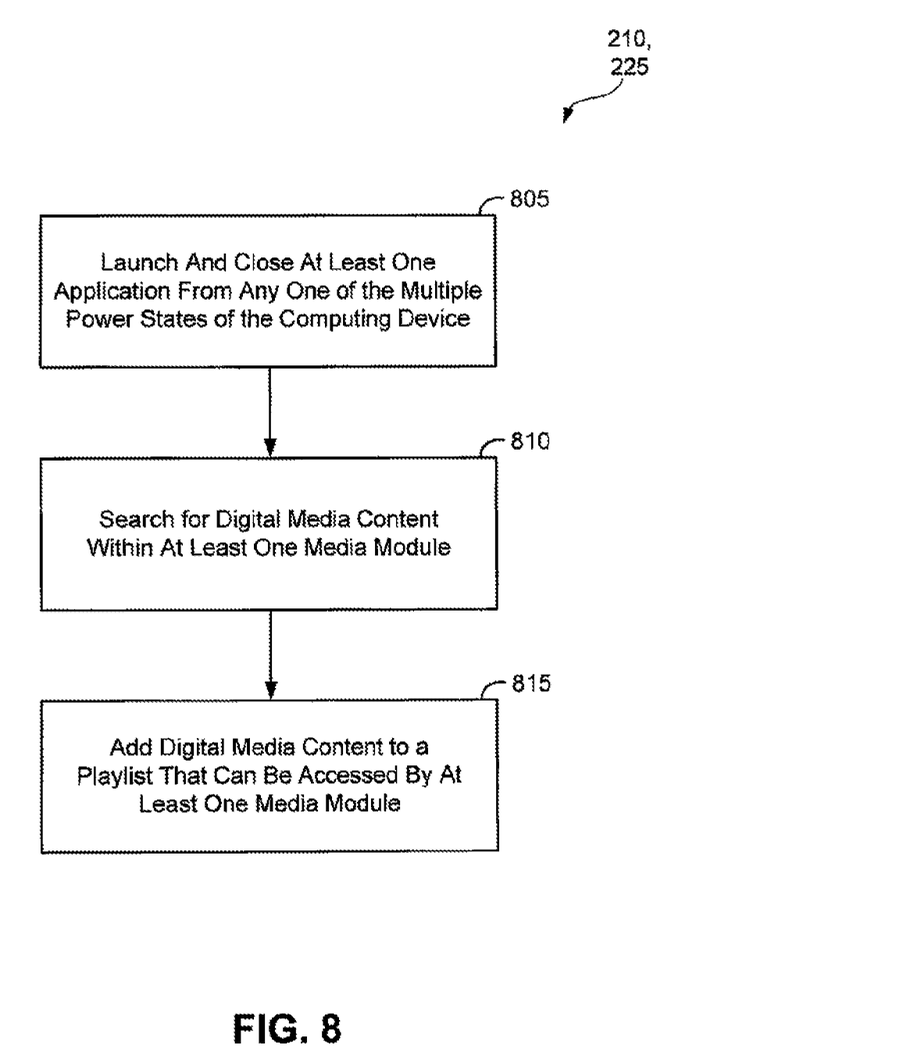
FIG. 8 is a high-level flow diagram that illustrates an embodiment of the architecture, functionality, and/or operation of a menu manager, such as that shown in FIG. 2.

FIG. 8 is a high-level flow diagram that illustrates an embodiment of the architecture, functionality, and/or operation of the menu manager 125, such as that shown in FIG. 3. At step 805, the menu manager 125 can launch and close at least one media module 325 (FIG. 3) from any one of the power states associated with a computing device 100 (FIG. 1). At steps 810 and 815, the menu manager 125 can search for digital media content within at least one media module 325 and add the digital media content to a playlist 330 that can be accessed by at least one media module 325.

Figure 9:
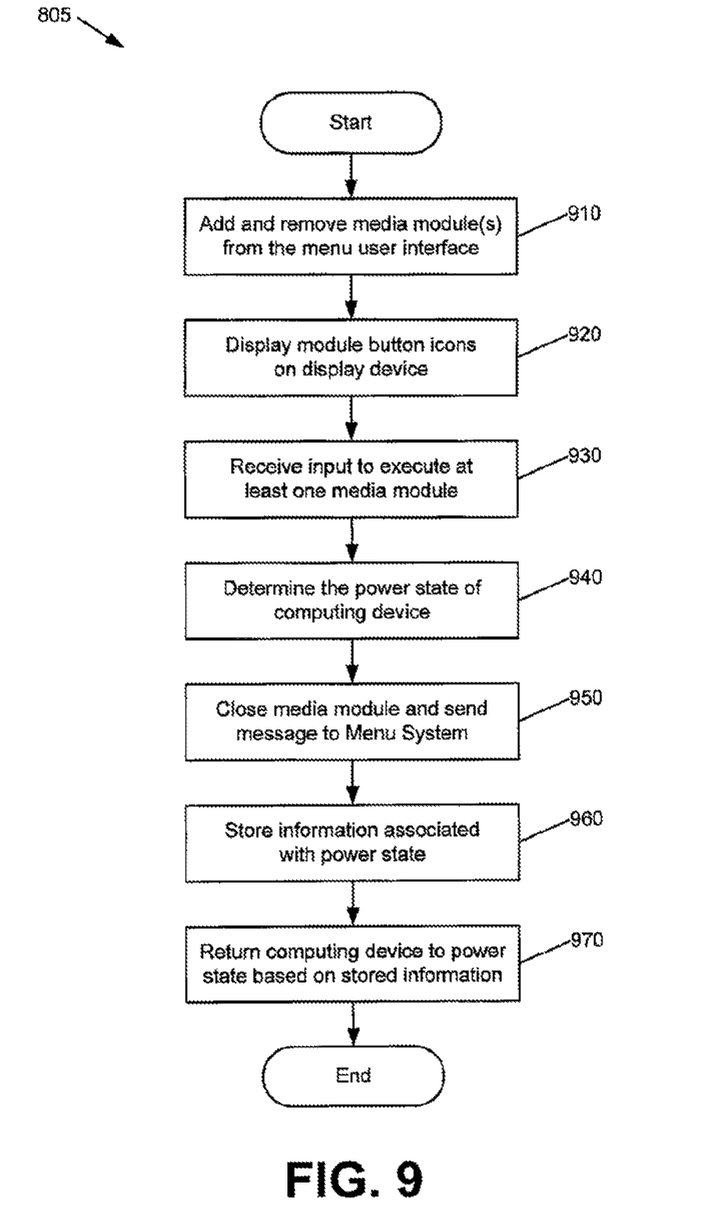
FIG. 9-11 are flow diagrams that illustrate an embodiment of architecture, functionality, and/or operation of a menu manager that performs respective steps 805, 810, and 815, such as that shown in FIG. 8.

FIG. 9 is a flow diagram that illustrates an embodiment of architecture, functionality, and/or operation of the menu manager 125 that performs step 805, such as that shown in FIG. 8. At step 910, the menu manager 125 adds and removes media modules 325 from the menu interface 610, 710. At steps 920 and 930, the menu manager 125 displays module button icons associated with a menu bar 615 (FIG. 6) on the display device and receives input from the user to execute at least one media module 325, respectively. At steps 940 and 950, the menu manager 125 determines the power state of the computing device 100, and closes the media module and sends a message to the menu system 310 (FIG. 3), respectively. At steps 960 and 970, the menu manager 125 stores information associated with the power state and returns the computing device to the power state based on the stored information, respectively.

Figure 10:
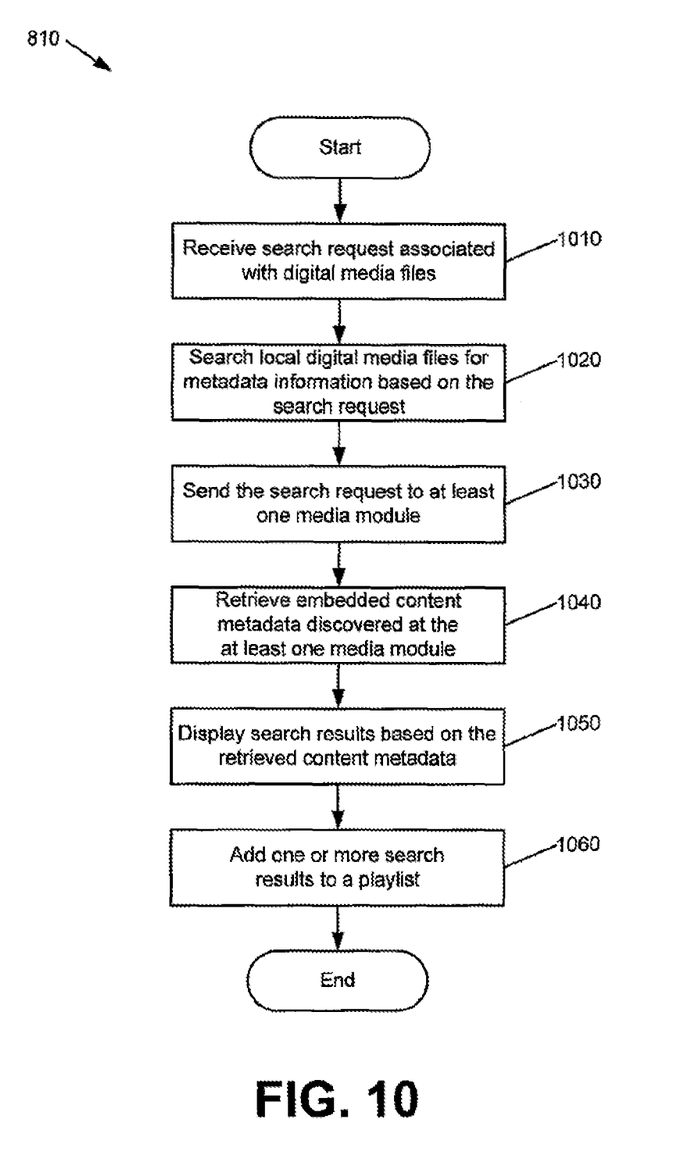

FIG. 10 is a flow diagram that illustrates an embodiment of architecture, functionality, and/or operation of the menu manager 125 that performs step 810, such as that shown in FIG. 8. At step 1010, the menu manager 125 receives a search request associated with digital media files. At steps 1020 and 1030, the menu manager 125 searches local digital media files for metadata information based on the search request and sends the search request to at least one media module 325, respectively. At steps 1040 and 1050, the menu manager 125 retrieves embedded content metadata discovered at the media module(s) 325 and displays search results based on the retrieved content metadata, respectively. At step 1060, the menu manager 125 adds one or more search results to a playlist 330.

Figure 11:
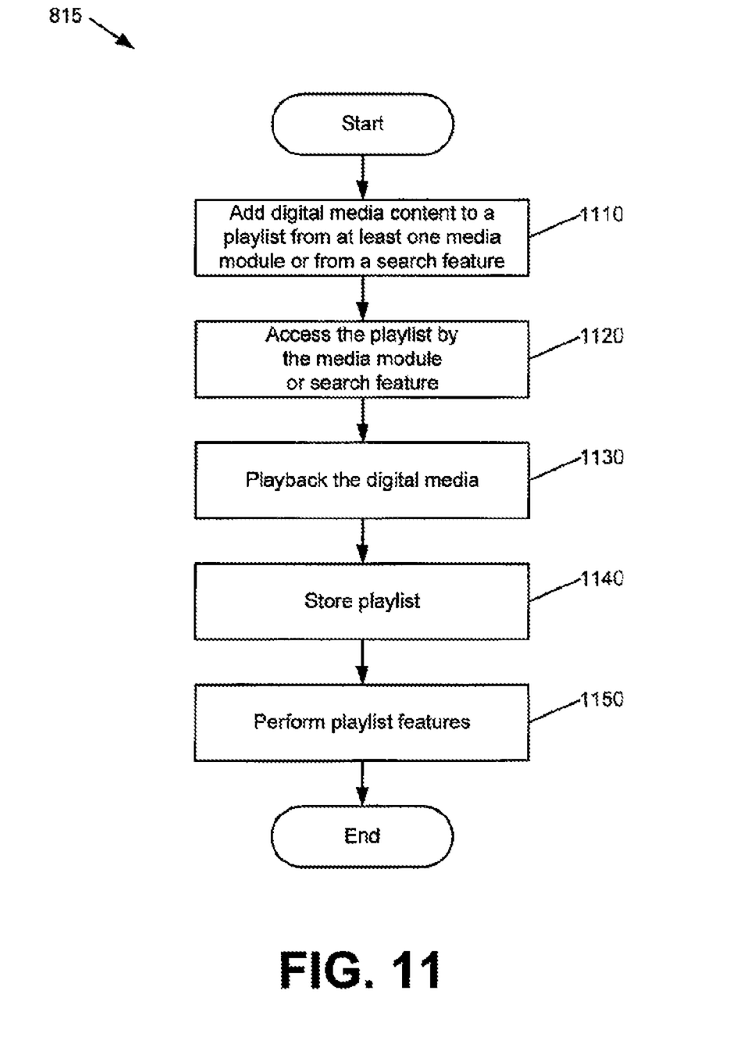

FIG. 11 is a flow diagram that illustrates an embodiment of architecture, functionality, and/or operation of the menu manager 125 that performs step 815, such as that shown in FIG. 8. At step 1110, the menu manager 125 adds the digital media content to a playlist 330 from at least one media module 325 or from a search feature 320. At steps 1120 and 1130, the media module 325 or the search feature 320 accesses the playlist 330 and plays back the digital media, respectively. At steps 1140 and 1150, the menu manager 125 stores the content of the playlist 330 to the memory 120 and performs functionality associated with the playlist 330, respectively.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

At least the following is claimed:

1. A method for communicating with media modules associated with a computing device, the method comprising:
   receiving an input to execute at least one media module;
   determining a power state of the computing device, the computing device having multiple power states; and
   responsive to determining the power state of the computing device, first loading a full menu user interface in S3, S4, and S5 power states and then booting an operating system in the S5 power state and resuming the operating system in the S3 and S4 power states, and launching the at least one media module with functionality based on the power state of the computing device, the at least one media module being configured to be launched from any one of the multiple power states of the computing device.

2. The method as defined in claim 1, further comprising:
   displaying a menu interface having button icons associated with the at least one media module on a display device; and
   adding and removing the media modules from the menu interface.

3. The method as defined in claim 1, further comprising storing information associated with the power state of the computing device.

4. The method as defined in claim 3, further comprising returning the computing device to a previous power state based on the stored information.

5. The method as defined in claim 1, wherein the power states include advanced configuration and power interface (ACPI) power states of the computing device, the ACPI power states including the following states: S0, S3, S4, and S5, the at least one media module being launched at the following states: S0, S3, S4, and S5.

6. The method as defined in claim 1, further comprising in an S0 power state and is first session load, resuming previous media module and loading full menu user interface based on resume state flag.

7. The method as defined in claim 1, further comprising in an S0 power state and is not first session load, resuming previous media module and loading menu bar user interface based on resume state flag.

8. The method as defined in claim 1, further comprising in an S0 power state and in as overlay, loading menu bar as overlay in current media module.

9. A system that is configured to communicate with media modules of a computing device, the system comprising:
   a menu system that receives an input to execute at least one media module, the menu system being configured to determine a power state of the computing device, the computing device having multiple power states, the menu system first loading a full menu user interface in S3, S4, and S5 power states and then booting an operating system in the S5 power state and resuming the operating system in the S3 and S4 power states; and
   at least one media module that communicates with the menu system, the menu system being further configured to facilitate launching the at least one media module with functionality based on the power state of the computing device, the at least one media module being configured to be launched from any one of the multiple power states of the computing device.

10. The system as defined in claim 9, further comprising a display device that is configured to display a menu interface having button icons associated with the at least one media module on a display device, the menu system being configured to facilitate adding and removing media modules from the menu interface.

11. The system as defined in claim 9, wherein the menu system is further configured to store information associated with the power state of the computing device.

12. The system as defined in claim 11, wherein the menu system is further configured to return the computing device to a previous power state based on the stored information.

13. The system as defined in claim 9, wherein the power states include advanced configuration and power interface (ACPI) power states of the computing, device, the ACPI power states including the following states: S0, S3, S4, and S5, the at least one media module being launched at the following states: S0, S3, S4, and S5.

14. A menu manager having instructions stored in memory of a computing device, the instructions comprising:
   logic to receive an input to execute at least one media module;
   logic to determine a power state of the computing device, the computing device having multiple power states;
   logic to first load a full menu user interface in S3, S4, and S5 power states and then booting an operating system in the S5 power state and resuming the operating system in the S3 and S4 power states; and
   logic to launch at least one media module with functionality based on the power state of the computing device, the at least one media module being configured to be launched from any one of the multiple power states of the computing device.

15. The menu manager as defined in claim 14, further comprising: logic configured to display a menu interface having button icons associated with the at least one media module on a display device; and logic configured to add and remove the media modules from the menu interface.

16. The menu manager as defined in claim 14, further comprising logic, configured to store information associated with the power state of the computing device.

17. The menu manager as defined in claim 16, further comprising logic configured to return the computing device to a previous power state based on the stored information.

18. The menu manager as defined in claim 14, wherein the power states include advanced configuration and power interface (ACPI) power states of the computing device, the ACPI power states including the following states: S0, S3, S4, and S5, the at least one media module being launched at the following states: S0, S3, S4, and S5.

19. The menu manager as defined in claim 14, further comprising logic configured to access a last used media module and resume last played media content if a previous session media module is configured to operate at an S0 power state.

20. The menu manager as defined in claim 19, further comprising logic configured to load and display a full menu user interface if the previous session media module is not configured to operate at the S0 power state.

* * * * *

UNITED STATES PATENT AND TRADEMARK OFFICE
CERTIFICATE OF CORRECTION

PATENT NO.         : 8,850,355 B2                                             Page 1 of 1
APPLICATION NO.    : 13/003532
DATED              : September 30, 2014
INVENTOR(S)        : Bennetts et al.

It is certified that error appears in the above-identified patent and that said Letters Patent is hereby corrected as shown below:

In the Claims

Column 10, line 46, Claim 13, delete "computing," and insert -- computing --, therefor.

Column 11, line 4, Claim 16, delete "logic," and insert -- logic --, therefor.

Signed and Sealed this
Third Day of February, 2015

Michelle K. Lee
*Deputy Director of the United States Patent and Trademark Office*